(No Model.)
J. S. BROOKS.
METALLIC ROOFING.
No. 503,941. Patented Aug. 29, 1893.
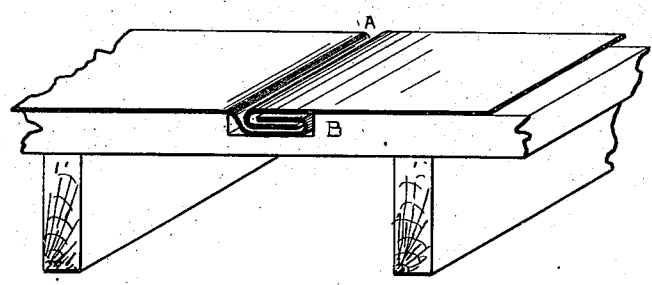
WITNESSES:
INVENTOR
John S. Brooks

UNITED STATES PATENT OFFICE.

JOHN S. BROOKS, OF BROOKLYN, NEW YORK.

METALLIC ROOFING.

SPECIFICATION forming part of Letters Patent No. 503,941, dated August 29, 1893.

Application filed April 10, 1893. Serial No. 469,839. (No model.)

*To all whom it may concern:*

Be it known that I, JOHN S. BROOKS, a citizen of the United States, residing at Brooklyn, in the county of Kings and State of New York, have invented a new and useful Improvement in Metallic Roofing, of which the following is a specification.

My invention relates to the style of metal roofing known as the lock or flat seam, and the object of it is to cause the tin or other material to lie flat and solid on the roofing boards, and present a level surface on its upper side. It is also better adapted to receive the solder and allow it to penetrate into the inner folds of the seam, than with the ordinary seam as formerly made.

The construction of my seam is shown by the accompanying drawing, which is a perspective view showing the edge of the seam and roofing boards.

In applying my seam, the tin or other metal, is cut to any desired size, and has the usual lock or fold turned on its edges. A groove B is cut into the upper surface of the roofing boards a trifle wider than the lock edge, and is carried across the roof and to such a depth that it will contain three of the four layers of metal composing the seam, and leave the main surface of the metal level and solid on the roofing boards. The grooves are cut across the roof, but are not made or needed for the seams that run lengthwise on the roof, and which can be made in the usual way. The groove can be easily and smoothly cut into the roofing boards by a suitable tool, similar to a dado plane, and the tool should be made so that it will at one operation, level off any inequalities in the surfaces of the roofing boards also. After the metal is laid on the roof in such position that the seam will be over the groove B, the process known as hammering down the seam sinks it also into the groove, leaving the upper surface flush.

My improved seam will permit of the soldering of cross seams on roofs having considerable more than the ordinary pitch, as in cases where metal is substituted in place of shingles.

By reference to the drawing at "A," it will be seen that for a short space, the course for the metal in soldering is downward, so that the solder readily enters into the seam; and it should be applied so freely, that the seam will be filled level with the surface.

The advantages claimed for my sunken seam are at least two-fold: It will admit the solder more freely into the seam, especially on roofs having considerable pitch, and fill the seam so that it will hardly be perceptible, protecting the edges of the locks from separating; and also, my sunken seam leaves no hollow space under the surface to sink down and form depressions that hold the water after raining, or accumulate dust. Experience shows that after a metal, or especially tin, roof has been walked on, as it must be in most cases, the seams form dams to hold back water and cause the metal to rust out. It is known that nearly all leakages on tin roofs occur at the cross seams, because they do not take in the solder freely as usually made, as the other seams will. When heavy and sufficiently solid paper is used under the metal, the grooves can be rolled into the paper at spaces that will correspond with the breadth of the cross layers of metal. The grooves may be made by a tool composed of a series of saws placed side by side, of sufficient number to cut the desired width of groove. The groove may also be made by burning it into the roofing boards with a red-hot iron drawn across the roof. An upper layer of any thin material may be used, and put on in such a manner that a space between its edges would form the grooves. It is believed that the method first mentioned of cutting with a plane into the roofing boards, is the most practical.

I claim—

A flat seam metal roof consisting of an upper surface of metal in which the seam is level on its upper side while the surplus metal of the seam is sunk into the roofing foundation in a manner that leaves no hollow space between the metal and the foundation and permits the solder to enter the seam in a downward course as shown and for the purposes specified.

JOHN S. BROOKS.

Witnesses:
W. M. COOTS,
A. W. MACY.